(12) United States Patent
Chen Huat Lai (10) Patent No.: US 11,814,125 B2
(45) Date of Patent: Nov. 14, 2023

(54) SELF-RELEASABLE SAFELY BELT (71) Applicant: GREEN 5 HOLDING PTE LTD, Singapore (SG)

(72) Inventor: Steven Chen Huat Lai, Singapore (SG)

(73) Assignee: GREEN 5 HOLDING PTE LTD, Singapore (SG)

( * ) Notice: Subject to any disclaimer, the term of this patent is extended or adjusted under 35 U.S.C. 154(b) by 0 days.

(21) Appl. No.: 17/252,103

(22) PCT Filed: Nov. 1, 2019

(86) PCT No.: PCT/SG2019/050536
§ 371 (c)(1),
(2) Date: Dec. 14, 2020

(87) PCT Pub. No.: WO2021/034265
PCT Pub. Date: Feb. 25, 2021

(65) Prior Publication Data
US 2022/0169329 A1    Jun. 2, 2022

(30) Foreign Application Priority Data
Aug. 22, 2019 (SG) .......................... 10201907758X (51) Int. Cl.
*B62J 27/10* (2020.01)
*B62J 25/06* (2020.01)

(52) U.S. Cl.
CPC ................ *B62J 27/10* (2020.02); *B62J 25/06* (2020.02)

(58) Field of Classification Search
CPC ........... B62J 25/06; B62J 27/10; B60R 22/24; B60R 22/322
See application file for complete search history.

(56) References Cited

U.S. PATENT DOCUMENTS

| 4,798,399 | A | * | 1/1989 | Cameron | B62J 27/10 280/801.1 |
|---|---|---|---|---|---|
| 4,813,706 | A | * | 3/1989 | Kincheloe | B60R 21/13 280/756 |
| 8,925,669 | B1 | * | 1/2015 | Saint-Hilaire | B60R 22/18 180/219 |
| 2003/0230886 | A1 | * | 12/2003 | Yamazaki | B62J 27/20 280/801.1 |

(Continued)

*Primary Examiner* — Tony H Winner
(74) *Attorney, Agent, or Firm* — Bay State IP, LLC (57) ABSTRACT

The present invention relates to a self-releasable safety belt for motorcycle or equivalent vehicles (100) comprising a lap belt (101) whereby both ends of said lap belt are affixed with a tongue connector (102), characterized in that, each of the tongue connector (102) is connected to a buckle (103) coupled to a swivel bracket (104), the swivel bracket (104) is fastened at both sides of the lower part of the vehicle's frame, the buckle (103) comprises a trigger button (105), the swivel bracket (104) comprises a pair of arms (107) which in parallel with the trigger button (105), wherein the lap belt (101) is fastened across the wearer's lap for holding the wearer in position during riding and whereby the trigger button (105) is triggered by the pair of arms (107) via swing force to detach the tongue connector (102) from the buckle (103) and release the lap belt (101) when the vehicle falls horizontally to ground to any direction.

8 Claims, 6 Drawing Sheets

(56) References Cited

U.S. PATENT DOCUMENTS

| | | | |
|---|---|---|---|
| 2006/0066091 A1* | 3/2006 | Matsuo | B62J 27/10 |
| | | | 280/801.1 |
| 2015/0091287 A1* | 4/2015 | Lich | B62K 11/04 |
| | | | 280/801.1 |
| 2015/0115587 A1* | 4/2015 | Chen | A44B 11/2503 |
| | | | 280/801.1 |

* cited by examiner

SELF-RELEASABLE SAFELY BELT

TECHNICAL FIELD

The present invention relates to a safety belt, more particularly to a self-releasable safety belt for motorcycle or equivalent vehicle's rider or a passenger.

BACKGROUND ART

In the recent years, riding a motorcycle is far more dangerous than driving a car. An accident involving motorcycle resulted in fatal injuries and death when compared to a car accident. Hence, a safety belt is important for a motorcycle rider or a passenger during unforeseen accidents.

The conventional safety belt is not protecting the rider or the passenger when the motorcycle falls off in any direction. Also, there is a difficulty in unlatching the belt during the accidents.

There have been a number of solutions provided for an effective safety belt and few of them have been discussed below:

KR 20080111656 A discloses a motorcycle safety belt comprises first and second auxiliary belt bundles respectively mounted on both side parts of a frame supporting a seat of a motorcycle, an auxiliary belt of which both end portions are connected to the first and second auxiliary belt bundles in a way that the auxiliary belt can be drawn and returned, a driver's waist belt connected to an intermediate portion of the auxiliary belt, and a buckle mounted on one end of the driver's waist belt. However, the prior art does not disclose that the lap belt is connected to a swivel mounting bracket which able to rotate to 360°.

U.S. Pat. No. 8,925,669 B1 relates to a motorcycle safety belt device secures a rider onto a motorcycle. The device includes a motorcycle having a main seat. A first strap has a first end and a second end. The first end of the first strap is coupled to the motorcycle proximate the main seat. The second end of the first strap is coupled to the motorcycle proximate the main seat such that the first strap is selectively position able to extend over the main seat of the motorcycle. A buckle selectively couples a first section of the first strap to a second section of the first strap. However, the prior art does not disclose that the lap belt is connected to a swivel mounting bracket which able to rotate to 360°.

Accordingly, it can be seen in the prior arts that there exists a need to have an improved safety belt for motorcycle that provides a protection to the rider or passenger if they fall in any direction.

SUMMARY OF THE INVENTION

An objective of the present invention is to provide a self-releasable safety belt to prevent the wearer from flung off during an accident whereby the fastened safety belt will hold the wearer in riding position.

It is an objective of the present invention to provide a self-releasable safety belt that comprises a sensor to release the safety belt when the motorcycle or equivalent vehicles fall off.

Another objective of the present invention is to provide a self-releasable safety belt that comprises a trigger button to release the safety belt when the motorcycle or equivalent vehicles fall off.

In addition, it is also an objective of the present invention to provide a self-releasable safety belt which able to automatically unlatch the safety belt when the motorcycle or equivalent vehicles fall in any directions.

Accordingly, these objectives may be achieved by following the teachings of the present invention. The present invention relates to a self-releasable safety belt for motorcycle or equivalent vehicles comprising a lap belt whereby both ends of said lap belt are affixed with a tongue connector, characterized in that, each of the tongue connector is connected to a buckle coupled to a swivel bracket, the swivel bracket is fastened at both sides of the lower part of the vehicle's frame, the buckle comprises a trigger button, the swivel bracket comprises a pair of arms which in parallel with the trigger button, wherein the lap belt is fastened across the wearer's lap for holding the wearer in position during riding and whereby the trigger button is triggered by the pair of arms via swing force to detach the tongue connector from the buckle and release the lap belt when the vehicle falls horizontally to ground to any direction.

BRIEF DESCRIPTION OF THE ACCOMPANYING DRAWINGS

So that the manner in which the above recited features of the present invention can be understood in detail, a more particular description of the invention, briefly summarized above, may have been referred by embodiments, some of which are illustrated in the appended drawings. It is to be noted, however, that the appended drawing illustrate only typical embodiments of this invention and are therefore not to be considered limiting of its scope, for the invention may admit to other equally effective embodiments.

These and other features, benefits, and advantages of the present invention will become apparent by reference to the following text figure, with like reference numbers referring to like structures across the views, wherein:

FIG. 6 is illustrating a ring holder (108*a*, 108*b*) in accordance with an embodiment of the present invention.

DETAILED DESCRIPTION OF THE PREFERRED EMBODIMENTS

While the present invention is described herein by way of example using embodiments and illustrative drawings, those skilled in the art will recognize that the invention is not limited to the embodiments of drawing or drawings described, and are not intended to represent the scale of the various components. Further, some components that may form a part of the invention may not be illustrated in certain figures, for ease of illustration, and such omissions do not limit the embodiments outlined in any way. It should be understood that the drawings and detailed description thereto are not intended to limit the invention to the particular form disclosed, but on the contrary, the invention is to cover all modifications, equivalents, and alternatives falling within the scope of the present invention as defined by the appended claim. As used throughout this description, the word "may" is used in a permissive sense (i.e. meaning having the potential to), rather than the mandatory sense, (i.e. meaning must). Further, the words "a" or "an" mean "at least one" and the word "plurality" means "one or more" unless otherwise mentioned. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Any discussion of documents, acts, materials, devices, articles and the like is included in the specification solely for the purpose of providing a context for the present invention. It is not suggested or represented that any or all of these matters form part of the prior art base or were common general knowledge in the field relevant to the present invention.

In this disclosure, whenever a composition or an element or a group of elements is preceded with the transitional phrase "comprising", it is understood that we also contemplate the same composition, element or group of elements with transitional phrases "consisting of", "consisting", "selected from the group of consisting of, "including", or "is" preceding the recitation of the composition, element or group of elements and vice versa.

The present invention is described hereinafter by various embodiments with reference to the accompanying drawing, wherein reference numerals used in the accompanying drawing correspond to the like elements throughout the description. This invention may, however, be embodied in many different forms and should not be construed as limited to the embodiment set forth herein. Rather, the embodiment is provided so that this disclosure will be thorough and complete and will fully convey the scope of the invention to those skilled in the art. In the following detailed description, numeric values and ranges are provided for various aspects of the implementations described. These values and ranges are to be treated as examples only, and are not intended to limit the scope of the claims. In addition, a number of materials are identified as suitable for various facets of the implementations. These materials are to be treated as exemplary, and are not intended to limit the scope of the invention.

Referring to the drawings, the invention will now be described in more detail.

Figure 1:
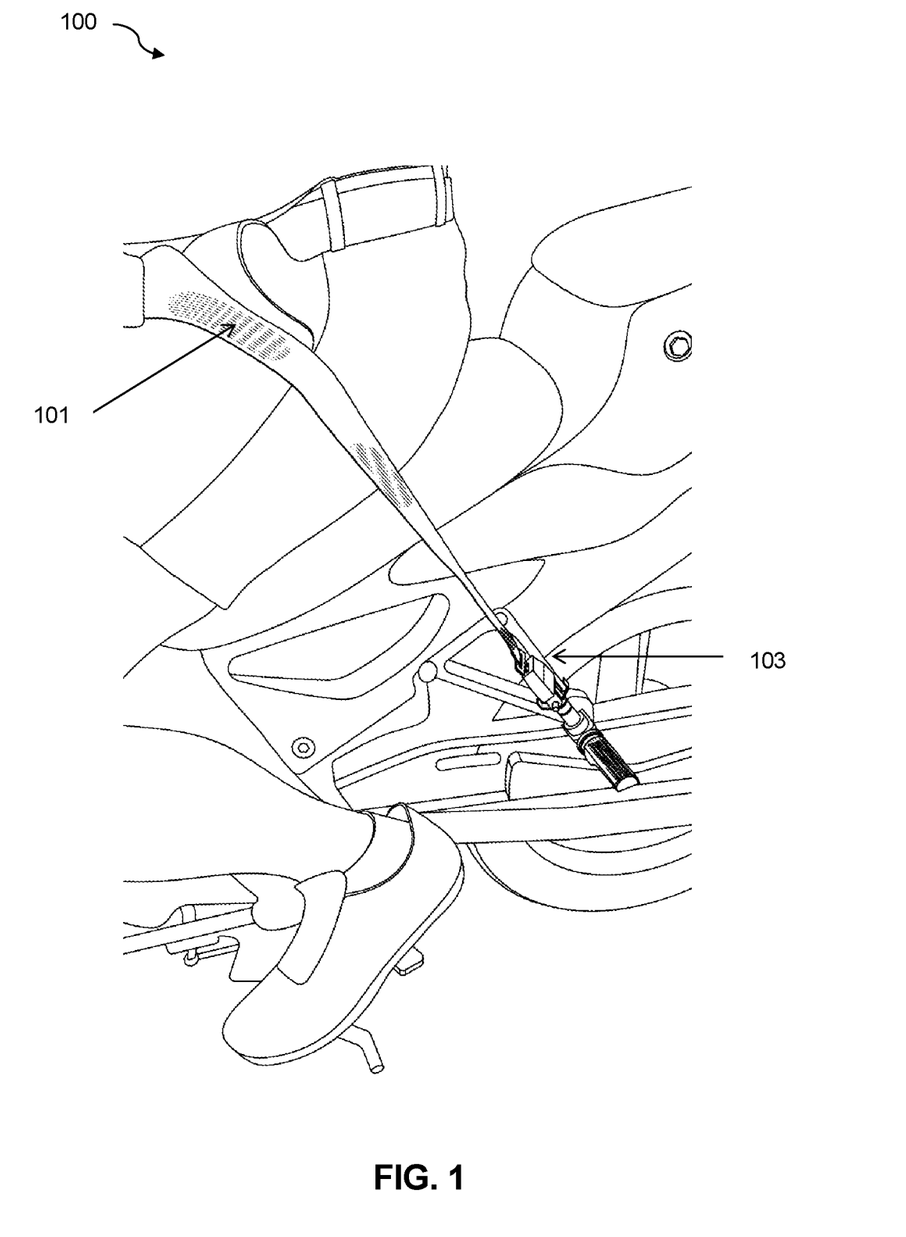
FIG. 1 is illustrating a self-releasable safety belt for motorcycle or equivalent vehicles (100) when the rider in a riding position in accordance with an embodiment of the present invention.

FIG. 1 is illustrating a self-releasable safety belt for motorcycle or equivalent vehicles (100) when the rider in a riding position in accordance with an embodiment of the present invention.

The present invention relates to a self-releasable safety belt for motorcycle or equivalent vehicles (100) comprising a lap belt (101) whereby both ends of said lap belt are affixed with a tongue connector (102), characterized in that, each of the tongue connector (102) is connected to a buckle (103) coupled to a swivel bracket (104), the swivel bracket (104) is fastened at both sides of the lower part of the vehicle's frame, the buckle (103) comprises a trigger button (105), the swivel bracket (104) comprises a pair of arms (107) which in parallel with the trigger button (105), wherein the lap belt (101) is fastened across the wearer's lap for holding the wearer in position during riding and whereby the trigger button (105) is triggered by the pair of arms (107) via swing force to detach the tongue connector (102) from the buckle (103) and release the lap belt (101) when the vehicle falls horizontally to ground to any direction.

In accordance with an embodiment of the present invention, the trigger button (105) is triggered by the pair of arms (107) via swing force to detach the tongue connector (102) from the buckle (103) and release the lap belt (101) when the vehicle falls at least 90° from the riding position.

In accordance with an embodiment of the present invention, the lower part of the vehicle's frame is the foot-operated levers or foot rest.

Figure 2:
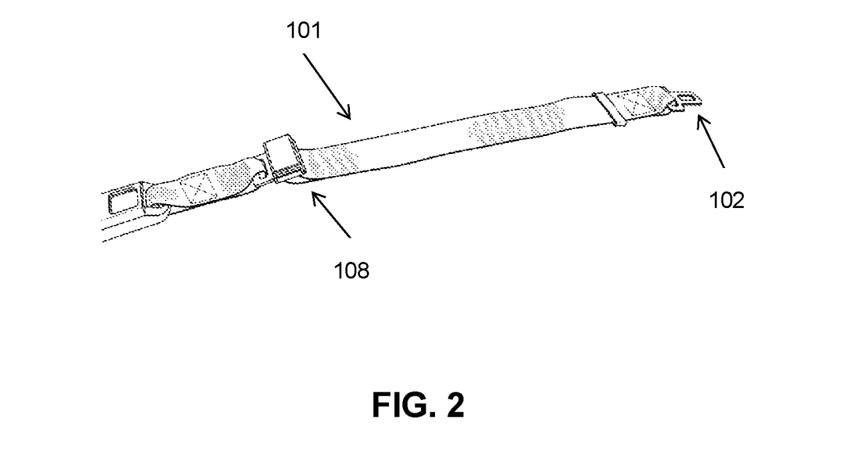
FIG. 2 is illustrating a lap belt (101) with a tongue connecter (102) in accordance with an embodiment of the present invention.

FIG. 2 is illustrating a lap belt (101) with a tongue connecter (102) in accordance with an embodiment of the present invention.

In accordance with an embodiment of the present invention, the lap belt (101) is fastened across the wearer's lap for holding the wearer in position during the impact from the accident when the vehicle still at upright or tilted position. This is to ensure that the wearer is not flung off during the accident.

In accordance with an embodiment of the present invention, the lap belt (101) is detachable when not in use.

Figure 3:
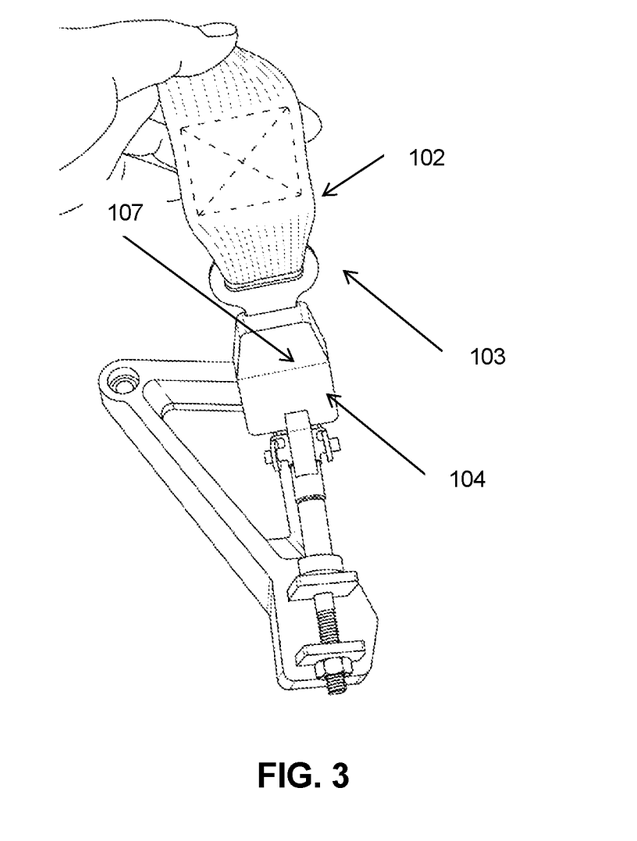
FIG. 3 is illustrating a tongue connector (102) connected to a buckle (103) that coupled to a bracket (104) in accordance with an embodiment of the present invention.

FIG. 3 is illustrating a tongue connector (102) is connected to a buckle (103) coupled to a swivel bracket (104) in accordance with an embodiment of the present invention.

In accordance with an embodiment of the present invention, the swivel bracket (104) is rotatable to 360° rotation. The swivel bracket (104) able to rotate according to the falling position of vehicle during the accident which helps to release the lap belt (101) even when the vehicle fall in any direction. The trigger button (105) is triggered by the pair of arms (107) via swing force whereby the buckle (103) auto-releasing the tongue connector (102) when the vehicle falls.

Figure 4:
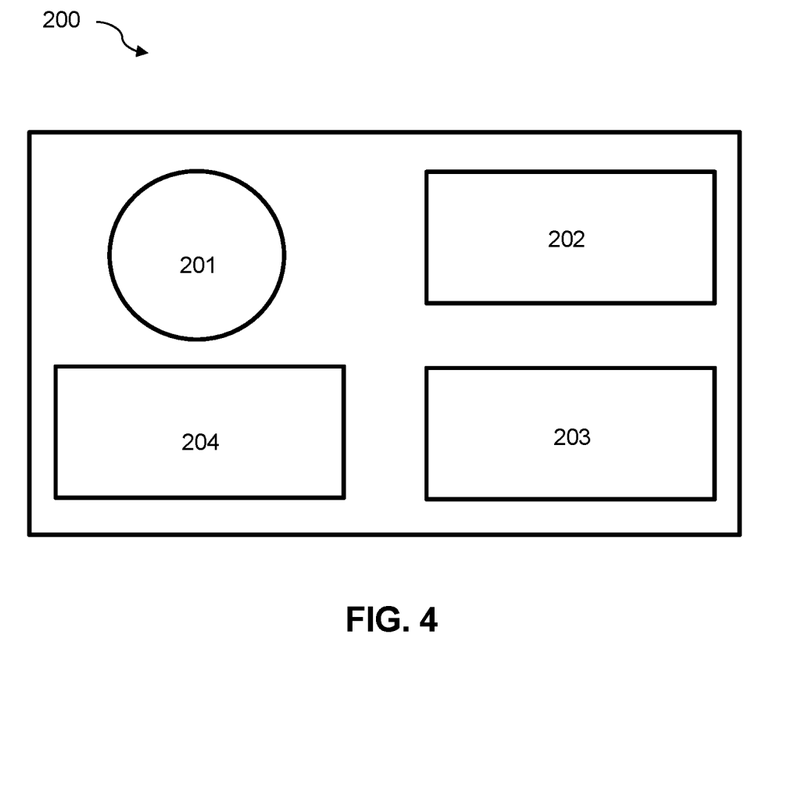
FIG. 4 is illustrating a sensor system (200) in accordance with an embodiment of the present invention.

FIG. 4 is illustrating a sensor system (200) in accordance with an embodiment of the present invention.

In accordance with an embodiment of the present invention, the buckle (103) comprises a built-in sensor system (200). The sensor system (200) comprising a micro-motor (201), a chipset (202), an electronic sensor (203) and a battery (204).

In accordance with an embodiment of the present invention, the electronic sensor (203) is activated when the vehicle falls horizontally to ground to any direction. In accordance with an embodiment of the present invention, the electronic sensor (203) send signals to the chipset (202), whereby the chipset (202) activates the micro-motor (201) to detach the tongue connector (102) from the buckle (103) and release the lap belt (101).

In accordance with an embodiment of the present invention, the self-releasable safety belt for motorcycle or equivalent vehicles (100) comprising two mode of operational function for releasing the tongue connector (102) of the lap belt (101) from the buckle (103) whereby the lap belt (101) is detached mechanically via swing force and also able to detach automatically via electronic sensor. In the case, if one of the modes of operational function is not working, another mode of operational function would release the lap belt. This provides double insurance to ensure the releasing of the lap belt (101) during unforeseen accidents.

Figure 5:
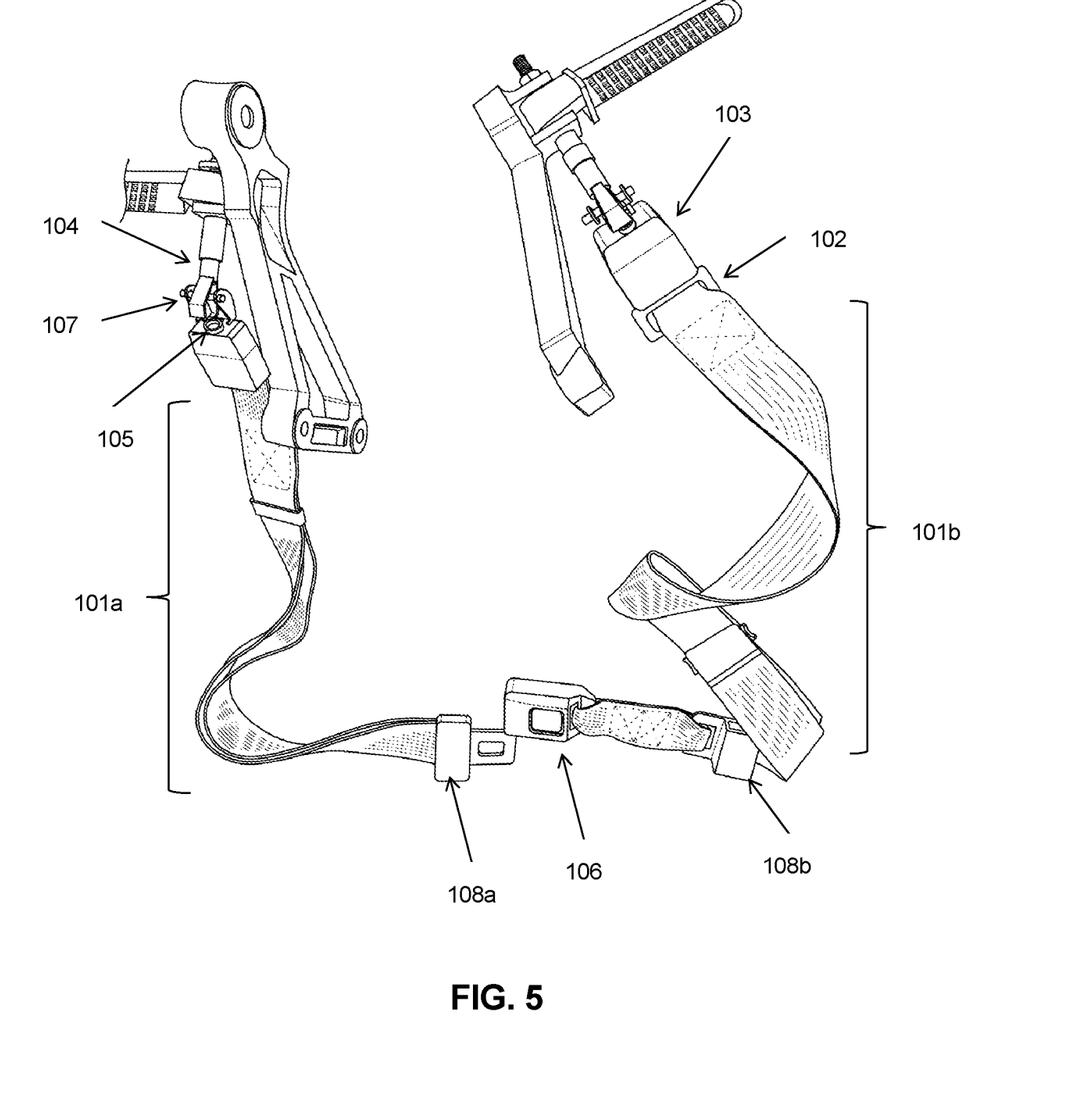
FIG. 5 is illustrating a self-releasable safety belt for motorcycle or equivalent vehicles (100) in accordance with an embodiment of the present invention.

FIG. 5 is illustrating a self-releasable safety belt for motorcycle or equivalent vehicles (100) in accordance with an embodiment of the present invention.

In accordance with an embodiment of the present invention, at least a ring holder (108) adjusting the lap belt (101) for loosening and tightening according to wearer comfort.

Figure 6:
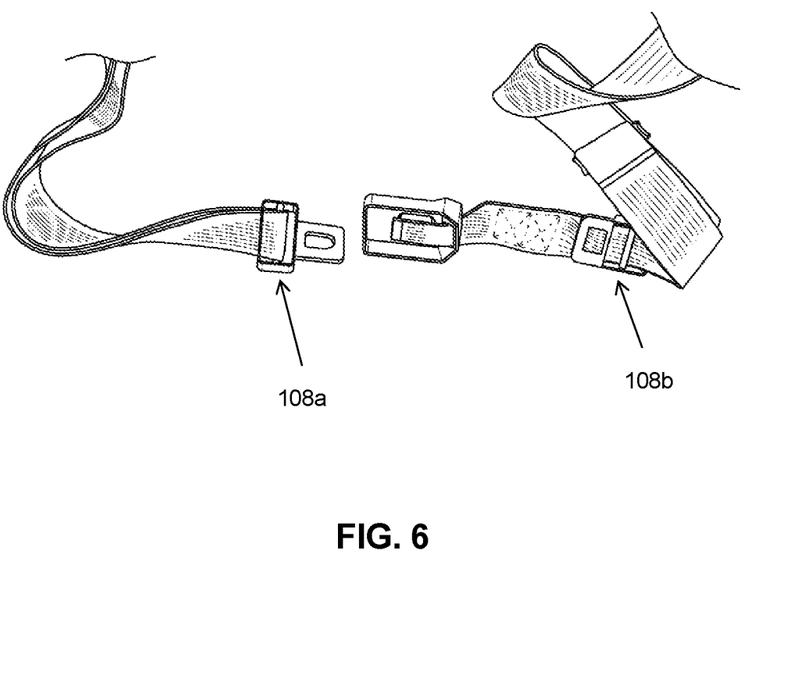

FIG. 6 is illustrating a ring holder (108*a*, 108*b*) in accordance with an embodiment of the present invention.

In accordance with a preferred embodiment of the present invention, the lap belt (101) comprising two straps (101*a*, 101*b*) whereby the first ends of both straps are affixed with a tongue connector.

In accordance with a preferred embodiment of the present invention, the second end of strap (101*a*) affixed with a tongue connector with a ring holder (108*a*).

In accordance with a preferred embodiment of the present invention, the second end of strap (101*b*) affixed with a ring holder (108*b*) and connected to a quick release buckle (106).

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and appended claim.

The invention claimed is:

1. A self-releasable safety belt for a vehicle comprising:
   a lap belt having two ends wherein each end of said lap belt are affixed with a tongue connector;
   each of the tongue connectors is connected to a buckle coupled to a swivel bracket;
   the swivel bracket is fastened at both sides of a lower part of a vehicle's frame;
   the buckle comprises a trigger button;
   the swivel bracket comprises a pair of arms which is in parallel with the trigger button;
   wherein the lap belt is provided for fastening across a rider's lap during riding; and
   wherein the trigger button is triggered by the pair of arms via a swing force to detach the tongue connector from the buckle and to release the lap belt when the vehicle falls horizontally to a ground in any direction.

2. The self-releasable safety belt as claimed in claim 1, wherein the lower part of the vehicle's frame is the foot-operated levers or foot rests.

3. The self-releasable safety belt as claimed in claim 1, wherein the swivel bracket is rotatable to 360° rotation.

4. The self-releasable safety belt as claimed in claim 1, wherein the buckle comprises a built-in sensor system.

5. The self-releasable safety belt as claimed in claim 4, wherein the sensor system comprises a micro-motor, a chipset, an electronic sensor and a battery.

6. The self-releasable safety belt as claimed in claim 5, wherein the electronic sensor is activated when the vehicle falls horizontally to the ground in any direction.

7. The self-releasable safety belt as claimed in claim 6, wherein the electronic sensor sends the signals to the chipset, the chipset activates the micro-motor to detach the tongue connector from the buckle and releases the lap belt.

8. The self-releasable safety belt as claimed in claim 1, further including at least one ring holder for adjusting the lap belt by loosening and tightening to provide comfort.

* * * * *